(12) United States Patent
Bivolarsky (10) Patent No.: US 9,185,437 B2
(45) Date of Patent: Nov. 10, 2015

(54) VIDEO DATA

(71) Applicant: Microsoft Corporation, Redmond, WA (US)

(72) Inventor: Lazar Bivolarsky, Cupertino, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 209 days.

(21) Appl. No.: 13/666,859

(22) Filed: Nov. 1, 2012

(65) Prior Publication Data

US 2014/0118562 A1    May 1, 2014

(51) Int. Cl.
*H04N 21/2343* (2011.01)
*H04N 21/2662* (2011.01)
*H04N 21/4223* (2011.01)

(52) U.S. Cl.
CPC ... *H04N 21/234363* (2013.01); *H04N 21/2662* (2013.01); *H04N 21/4223* (2013.01)

(58) Field of Classification Search
USPC ..................................................... 348/207.1
See application file for complete search history.

(56) References Cited

U.S. PATENT DOCUMENTS

| | | | |
|---|---|---|---|
| 6,304,682 B1 | 10/2001 | Patti | |
| 6,307,887 B1 | 10/2001 | Gabriel | |
| 6,636,533 B1 | 10/2003 | Baransky et al. | |
| 7,218,796 B2 | 5/2007 | Bishop | |
| 7,474,701 B2 | 1/2009 | Boice | |
| 7,559,661 B2 | 7/2009 | Widdowson et al. | |
| 7,844,001 B2 | 11/2010 | Routhier | |
| 7,856,154 B2 * | 12/2010 | Young | 382/299 |
| 8,078,009 B2 | 12/2011 | Riley et al. | |
| 8,213,746 B2 | 7/2012 | Volovelsky | |
| 2003/0118096 A1 | 6/2003 | Ishtiaq et al. | |
| 2003/0194009 A1 | 10/2003 | Srinivasan | |

(Continued)

FOREIGN PATENT DOCUMENTS

| | | |
|---|---|---|
| EP | 1492051 | 12/2004 |
| EP | 1534015 | 5/2005 |

(Continued)

OTHER PUBLICATIONS

"International Search Report and Written Opinion", Application No. PCT/US2013/067910, Feb. 13, 2014, 10 pages.

(Continued)

*Primary Examiner* — Roberto Velez
*Assistant Examiner* — Yih-Sien Kao
(74) *Attorney, Agent, or Firm* — Danielle Johnston-Holmes; Micky Minhas (57) ABSTRACT

Computer program products and a mobile terminal for transmitting and receiving video data. Image data of first and second frames of a video signal captured by a camera is used to determine encoded first spatial units of the first frame and encoded second spatial units of the second frame at lower spatial resolution, which are transmitted to the receiver terminal. The second spatial units are unaligned with the first spatial units due to rotation of the camera between the first and second frames, such that each of the second spatial units partially overlaps with at least one first spatial unit. An indication of the angle of rotation of the camera between the first and second frames is detected using a rotational motion sensor and transmitted to the receiver terminal. The receiver terminal combines the first and second spatial units using the indication to reconstruct an image of higher spatial resolution.

20 Claims, 10 Drawing Sheets

(56) References Cited

U.S. PATENT DOCUMENTS

| | | | |
|---|---|---|---|
| 2003/0202607 | A1 | 10/2003 | Srinivasan |
| 2004/0032969 | A1 | 2/2004 | Kazui et al. |
| 2004/0218670 | A1 | 11/2004 | Lai |
| 2005/0232514 | A1 | 10/2005 | Chen |
| 2006/0120464 | A1 | 6/2006 | Hannuksela |
| 2006/0274156 | A1* | 12/2006 | Rabbani et al. .......... 348/208.99 |
| 2007/0232336 | A1* | 10/2007 | Kim et al. .................. 455/466 |
| 2009/0161992 | A1 | 6/2009 | Taguchi et al. |
| 2009/0274380 | A1* | 11/2009 | Wedi ............................. 382/233 |
| 2009/0290644 | A1 | 11/2009 | Gordon et al. |
| 2010/0033602 | A1 | 2/2010 | Okada et al. |
| 2010/0260259 | A1 | 10/2010 | Kimmich et al. |
| 2010/0260268 | A1 | 10/2010 | Cowan |
| 2010/0266041 | A1 | 10/2010 | Gish |
| 2010/0272184 | A1 | 10/2010 | Fishbain |
| 2011/0050935 | A1 | 3/2011 | Mukherjee |
| 2011/0206113 | A1 | 8/2011 | Bivolarsky et al. |
| 2011/0206131 | A1 | 8/2011 | Vafin et al. |
| 2011/0206132 | A1 | 8/2011 | Bivolarsky |
| 2012/0044990 | A1 | 2/2012 | Bivolarsky et al. |
| 2012/0128202 | A1* | 5/2012 | Shimizu et al. ............... 382/103 |
| 2012/0140018 | A1* | 6/2012 | Pikin et al. ................. 348/14.02 |
| 2012/0147205 | A1 | 6/2012 | Lelescu |
| 2012/0189057 | A1 | 7/2012 | Ugur et al. |
| 2012/0195369 | A1 | 8/2012 | Guerrero |
| 2012/0210217 | A1 | 8/2012 | Abbas |
| 2012/0294369 | A1 | 11/2012 | Bhagavathy et al. |
| 2013/0044804 | A1 | 2/2013 | Nilsson et al. |
| 2014/0118460 | A1 | 5/2014 | Bivolarsky et al. |
| 2014/0119446 | A1 | 5/2014 | Bivolarsky |
| 2014/0119456 | A1 | 5/2014 | Bivolarsky |

FOREIGN PATENT DOCUMENTS

| | | |
|---|---|---|
| EP | 1659532 | 5/2006 |
| EP | 1837826 | 9/2007 |
| JP | 2006337771 | 12/2006 |
| WO | WO-02078353 | 10/2002 |
| WO | WO-2011090790 | 7/2011 |
| WO | WO-2011101448 | 8/2011 |

OTHER PUBLICATIONS

"International Search Report and Written Opinion", Application No. PCT/US2013/067596, Jan. 16, 2014, 11 pages.

"International Search Report and Written Opinion", Application No. PCT/US2013/067603, Jan. 8, 2014, 13 pages.

"International Search Report and Written Opinion", Application No. PCT/US2013/067909, Feb. 3, 2014, 13 pages.

Barbarien, et al.,' "Scalable Motion Vector Coding", Electronics Letters Jul. 22, 2004 vol. 40 No. 15, 2004, 2 pages.

Katsaggelos, et al.,' "High-Resolution Images from Low-Resolution Compressed Video", May 2003, 12 pages.

Park, et al., "Super-Resolution Image Reconstruction: A Technical Overview", Retrieved at <<http://ieeexplore.ieee.org/stamp/stamp.jsp?tp=&arnumber=1203207>>, In Proceedings of IEEE Signal Processing Magazine, vol. 20, Issue 3, May 2003, pp. 16.

Liyakathunisa, et al., "A Novel Super Resolution Reconstruction of Low Resolution Images Progressively Using DCT and Zonal Filter Based Denoising", Retrieved at <<http://arxiv.org/ftp/arxiv/papers/1102/1102.5688.pdf>>, In Proceedings of International Journal of Computer Science & Information Technology (IJCSIT), vol. 3, No. 1, Feb. 2011, pp. 20.

Borman, et al., "Spatial Resolution Enhancement of Low-Resolution Image Sequences A Comprehensive Review with Directions for Future Research", Retrieved at <<http://citeseerx.ist.psu.edu/viewdoc/download?doi=10.1.1.62.6195&rep=rep1&type=pdf>>, Jul. 8, 1998, pp. 15.

Shechtman, et al., "Space-Time Super-Resolution", Retrieved at <<http://ieeexplore.ieee.org/stamp/stamp.jsp?tp=&arnumber=1401907>>, In Proceedings of IEEE Transactions on Pattern Analysis and Machine Intelligence, vol. 27, No. 4, Apr. 2005, pp. 15.

Rad, et al., "Multidimensional Image Enhancement from a Set of Unregistered and Differently Exposed Images", Retrieved at <<http://infoscience.epfl.ch/record/89715/files/Sr-HDR2.pdf>>, In Proceedings of SPIE, the International Society for Optical Engineering, Feb. 2007, pp. 12.

"Computer Vision System Toolbox", Retrieved at <<http://www.mathworks.in/products/computer-vision/examples.html?file=/products/demos/shipping/vision/videostabilize_pm.html>>, Retrieved Date: Aug. 21, 2012, pp. 10.

Barreto, D et al., "Motion Estimation Techniques in Super-Resolution Image Reconstruction", *Virtual Observatory: Plate Content Digitization, Archive Mining & Image Sequence Processing*, edited by Heron Press, vol. I., (Apr. 2005), 16 pages.

Bishop, Christopher M., "Super-resolution Enchancement of Video", *In Proceedings of the Ninth International Workshop on Artificial Intelligence and Statistics*, (Jan. 3, 2003), 8 pages.

Brandi, Fernanda "Super Resolution of Video Using Key Frames", *IEEE International Symposium on Circuits and Systems.*, (May 18, 2008), 4 pages.

Lai, Wei et al., "A Region Based Multiple Frame-Rate Tradeoff of Video Streaming", *International Conference on Image Processing, 2004, ICIP '04*, (2004), 4 pages.

Mantiuk, Rafal "Perception-motivated High Dynamic Range Video Encoding", *SIGGRAPH '04*, (Aug. 6, 2004), 9 pages.

Molina, R et al., "Towards a new video compression scheme using super-resolution", *In Proceedings of the SPIE conference on visual communications and image processing*, (Jan. 15, 2006), 13 pages.

Segall et al., "Chapter 11 Super-Resolution from Compressed Video", *Super-Resolution Imaging*, vol. 1—Retrieved from >http://decsai.ugr.es.vip/files/books/01lo2hichpater.pdf< on Aug. 21, 2012, 32 pages.

Song, Hwangjun et al., "Rate Control for Low-Bit-Rate Video via Variable-Encoding Frame Rates", *IEEE Transactions on Circuits and Systems for Video Technology*, (Apr. 4, 2011), pp. 512-521.

Zaccarin, Andrk "Multi-Rate Encoding of a Video Sequence in the DCT Domain", *IEEE International Symposium on Circuits and Systems*, 2002, (May 2002), pp. 680-683.

"Non-Final Office Action", U.S. Appl. No. 13/666,839, Mar. 11, 2015, 16 pages.

"Non-Final Office Action", U.S. Appl. No. 13/666,683, Jun. 29, 2015, 22 pages.

"Final Office Action", U.S. Appl. No. 13/666,839, Aug. 6, 2015, 14 pages.

"Non-Final Office Action", U.S. Appl. No. 13/666,734, Sep. 3, 2015, 28 pages.

* cited by examiner

VIDEO DATA

BACKGROUND

In the transmission of a video signal, a video encoder at a transmitter terminal receives input video data comprising a sequence of "raw" video frames to be encoded, each representing an image at a respective moment in time. The encoder encodes each input frame into an encoded frame (e.g. either as an intra frame or as an inter frame). The purpose of the encoding is to compress the video data so as to incur fewer bits when transmitted over a transmission medium or stored on a storage medium.

Each frame of video data may be encoded into one or more spatial units for respective image regions of the frame. When the video data has been encoded and transmitted to a receiver terminal, the receiver terminal decodes the spatial units for each of the image regions of the frames to thereby recover data values (e.g. luminance and chrominance values according to the YUV colour space scheme) representing the image regions. In this way the receiver terminal can recover the frames of the video signal. The recovered frames may be stored at the receiver terminal, transmitted to another terminal or output from the receiver terminal, e.g. to a user of the receiver terminal using a display of the receiver terminal.

In the transmission of a video signal, there is a trade off between the quality of the video signal that can be recovered at the receiver terminal (e.g. the resolution, frame rate and error rate of the video signal) and the amount of data that needs to be transmitted.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A camera which captures image data for frames of a video signal may be rotated (either intentionally or not intentionally) between the time at which a first frame is captured and the time at which a second frame is captured. The frames of the video signal may be encoded into one or more spatial units for respective image regions of the frame which are each represented by a set of one or more data values (e.g. luminance and chrominance values according to the YUV colour space scheme). The rotation of the camera may cause first spatial units of the first frame to be at least partially unaligned with second spatial units of the second frame. This means that each of the second spatial units may partially overlap spatially with at least one first spatial unit. This enables the receiver terminal to combine the first and second spatial units to determine data values for each distinct image region given by each distinct combination of partially overlapping first and second spatial units. In this way the receiver can reconstruct an image of a higher spatial resolution than the resolution of the first spatial units and the resolution of the second spatial units. This process of combining image data from two frames to create an image of higher resolution allows the resolution of the video data recovered at the receiver terminal to be increased without requiring a significant increase in the amount of data that is transmitted and may be referred to herein as a process of "super resolution". This is achieved by making use of the rotation of the camera between the first and second frames.

BRIEF DESCRIPTION OF THE DRAWINGS

For a better understanding of the described embodiments and to show how the same may be put into effect, reference will now be made, by way of example, to the following drawings in which.

DETAILED DESCRIPTION

Various embodiments will now be described by way of example only.

Figure 1:
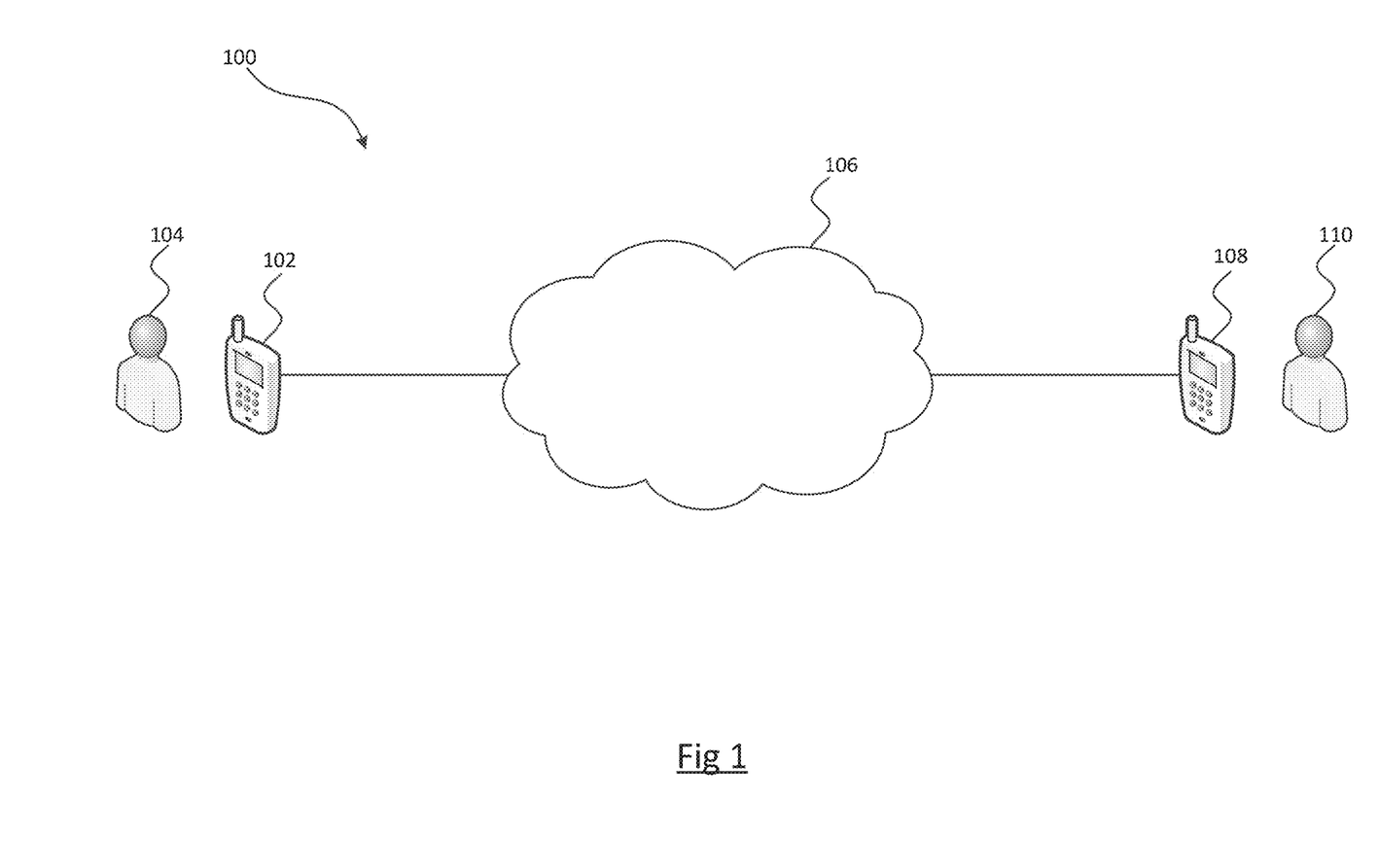
FIG. 1 shows a communication system including two user terminals.

FIG. 1 shows a communication system 100 comprising a first user 104 who is associated with a first user terminal 102 and a second user 110 who is associated with a second user terminal 108. In other embodiments the communication system 100 may comprise any number of users and associated user terminals. The user terminals 102 and 108 can communicate over the network 106 in the communication system 100, thereby allowing the users 104 and 110 to communicate with each other over the network 106. In one embodiment the communication system 100 is a packet-based, P2P communication system, but other types of communication system could also be used, such as non-P2P, VoIP or IM systems. The network 106 may, for example, be the Internet or another type of network such as a telephone network (such as the PSTN or a mobile telephone network). Each of the user terminals 102 and 108 may be, for example, a mobile phone, a tablet, a laptop, a personal computer ("PC") (including, for example, Windows™, Mac OS™ and Linux™ PCs), a gaming device, a television, a personal digital assistant ("PDA") or other embedded device able to connect to the network 106. The user terminal 102 is arranged to receive information from and output information to the user 104 of the user terminal 102. The user terminal 102 comprises a camera for capturing images of a video signal. The user terminal 102 also comprises a display such as a screen and an input device such as a keypad, a touch-screen, and/or a microphone. The user terminal 102 is connected to the network 106.

The user terminal 102 executes a communication client, provided by a software provider associated with the communication system 100. The communication client is a software program stored on a tangible, computer-readable storage medium executed on a local processor in the user terminal 102. The client performs the processing required at the user terminal 102 in order for the user terminal 102 to transmit and receive data over the communication system 100. The client executed at the user terminal 102 may be authenticated to communicate over the communication system through the presentation of digital certificates (e.g. to prove that user 104 is a genuine subscriber of the communication system).

The user terminal 108 may correspond to the user terminal 102. The user terminal 108 executes, on a local processor, a communication client which corresponds to the communication client executed at the user terminal 102. The client at the user terminal 108 performs the processing required to allow the user 110 to communicate over the network 106 in the same way that the client at the user terminal 102 performs the processing required to allow the user 104 to communicate over the network 106. The user terminals 102 and 108 are end points in the communication system. FIG. 1 shows only two users (104 and 110) and two user terminals (102 and 108) for clarity, but many more users and user terminals may be included in the communication system 100, and may communicate over the communication system 100 using respective communication clients executed on the respective user terminals.

Figure 2:
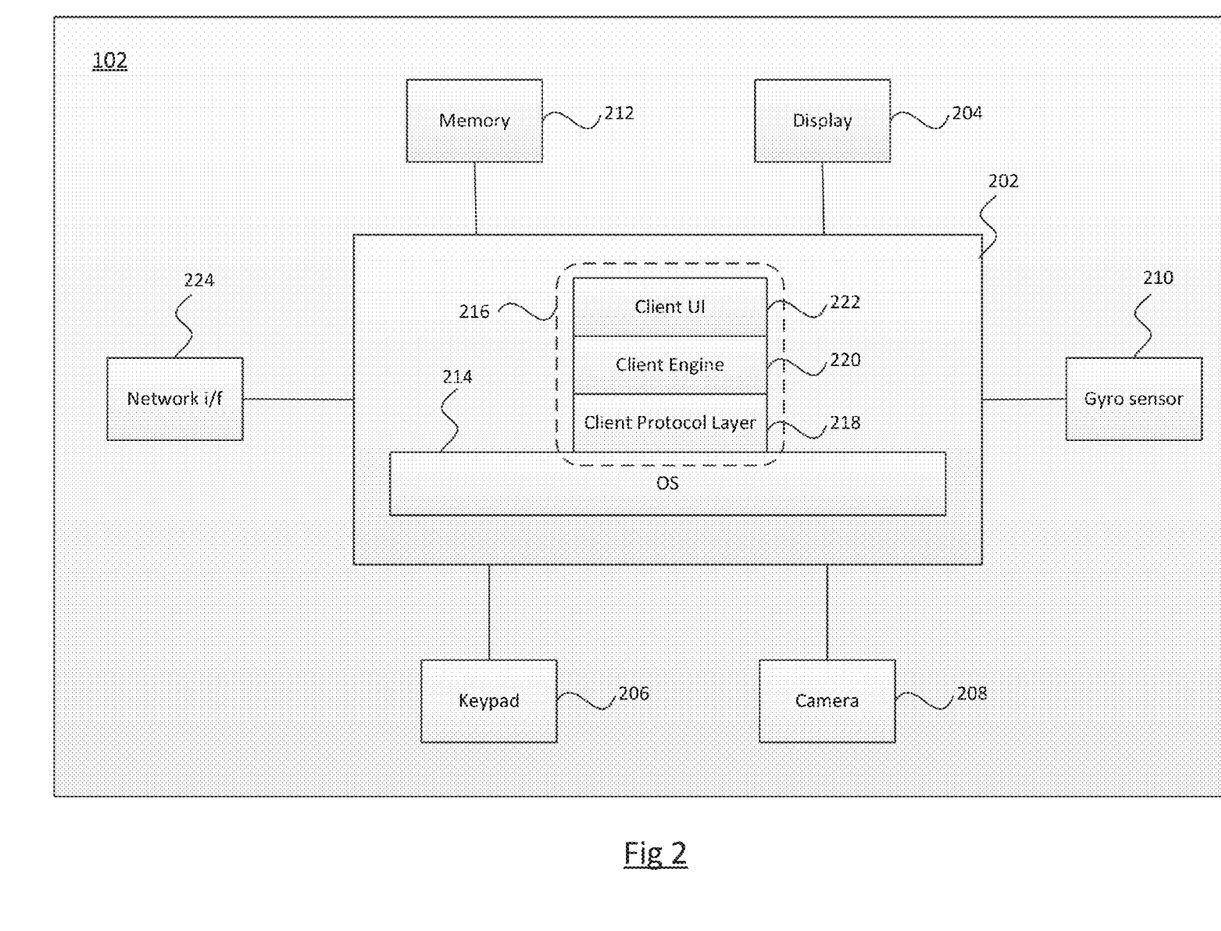
FIG. 2 shows a schematic view of a user terminal.

FIG. 2 illustrates a detailed view of the user terminal 102 on which is executed a communication client for communicating over the communication system 100. The user terminal 102 comprises a central processing unit ("CPU") 202, to which is connected a display 204 such as a screen, input devices such as a keypad 206 and a camera 208 and a gyro sensor 210 for detecting rotational motion. The display 204, keypad 206, camera 208 and gyro sensor 210 may be integrated into the user terminal 102 as shown in FIG. 2. In alternative user terminals one or more of the display 204, the keypad 206, the camera 208 and the gyro sensor 210 may not be integrated into the user terminal 102 and may be connected to the CPU 202 via respective interfaces. One example of such an interface is a USB interface. The CPU 202 is connected to a network interface 224 such as a modem for communication with the network 106. The network interface 224 may be integrated into the user terminal 102 as shown in FIG. 2. In alternative user terminals the network interface 224 is not integrated into the user terminal 102. The user terminal 102 also comprises a memory 212 for storing data.

FIG. 2 also illustrates an operating system ("OS") 214 executed on the CPU 202. Running on top of the OS 214 is a software stack 216 for the client software of the communication system 100. The software stack shows a client protocol layer 218, a client engine layer 220 and a client user interface layer ("UI") 222. Each layer is responsible for specific functions. Because each layer usually communicates with two other layers, they are regarded as being arranged in a stack as shown in FIG. 2. The operating system 214 manages the hardware resources of the computer and handles data being transmitted to and from the network 106 via the network interface 224. The client protocol layer 218 of the client software communicates with the operating system 214 and manages the connections over the communication system. Processes requiring higher level processing are passed to the client engine layer 220. The client engine 220 also communicates with the client user interface layer 222. The client engine 220 may be arranged to control the client user interface layer 222 to present information to the user 104 via the user interface of the client and to receive information from the user 104 via the user interface.

The user terminal 108 is implemented in the same way as user terminal 102 as described above, wherein the user terminal 108 may have corresponding elements to those described herein in relation to user terminal 102.

Figure 3:
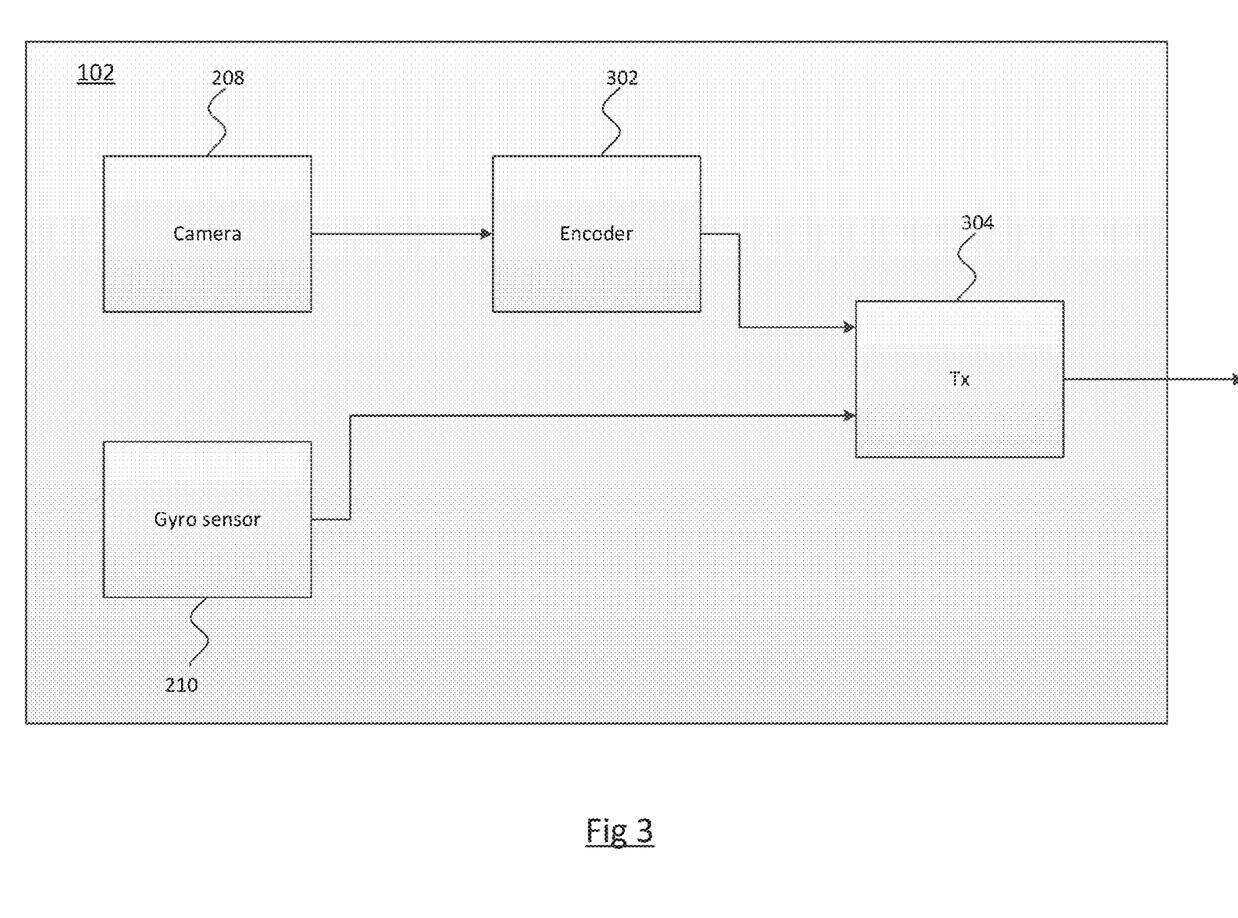
FIG. 3 shows a functional block diagram of a transmitter terminal.

FIG. 3 shows a functional block diagram of the user terminal 102 being implemented as a transmitter terminal in a video transmission session with the user terminal 108 over the communication system 100. The user terminal 102 comprises the camera 208, the gyro sensor 210, an encoder module 302 and a transmitter module 304. An output of the camera 208 is coupled to an input of the encoder module 302. An output of the encoder module 302 is coupled to a first input of the transmitter module 304. An output of the gyro sensor is coupled to a second input of the transmitter module 304. The transmitter module 304 is configured to transmit an output from the user terminal 102 over the network 106 to the user terminal 108 in the video transmission session.

Figure 4:
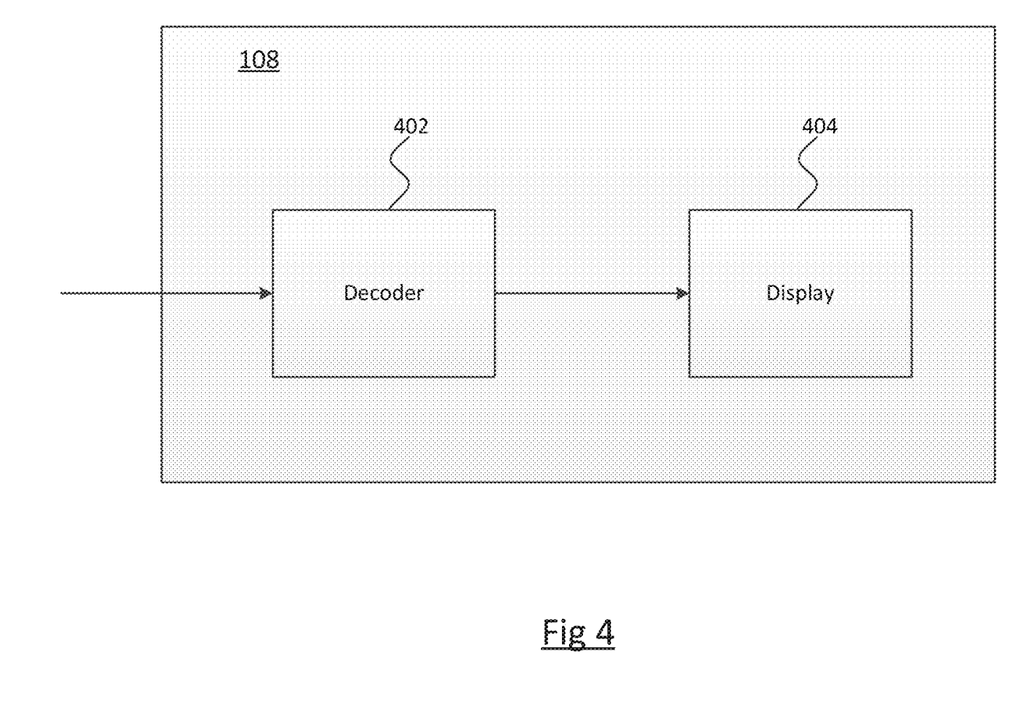
FIG. 4 shows a functional block diagram of a receiver terminal.

FIG. 4 shows a functional block diagram of the user terminal 108 being implemented as a receiver terminal in the video transmission session with the user terminal 102 over the communication system 100. The user terminal 108 comprises a decoder module 402 and a display 404. The decoder module 402 is configured to receive video data from the user terminal 102 over the network 106 in the video transmission session. An output of the decoder module 402 is coupled to an input of the display 404. The display is configured to output, to the user 110, video data received from the user terminal 102 in the video transmission session.

Figure 5A:
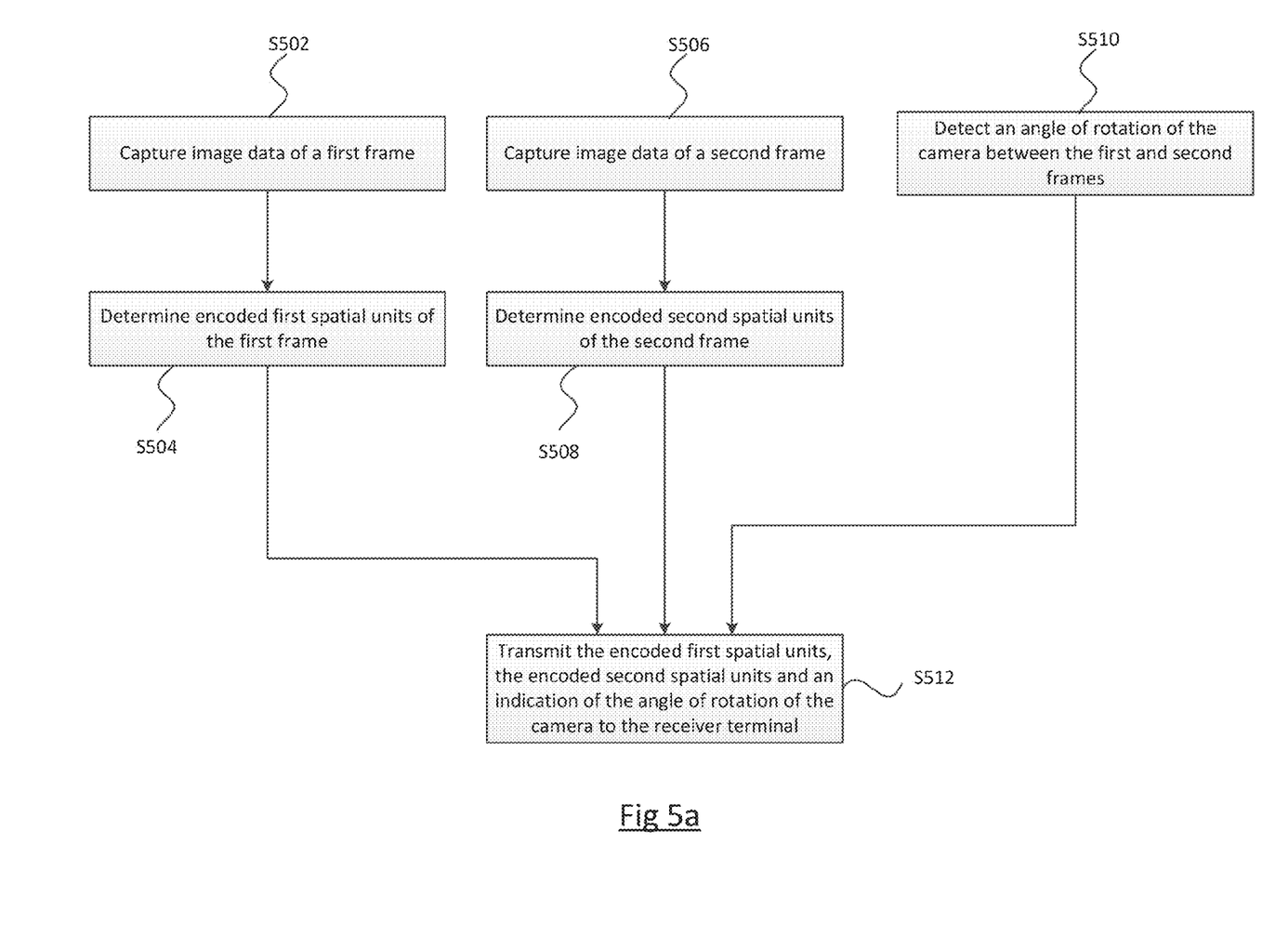
FIG. 5a is a flow chart for a process of transmitting video data from a transmitter terminal to a receiver terminal.
Figure 5B:
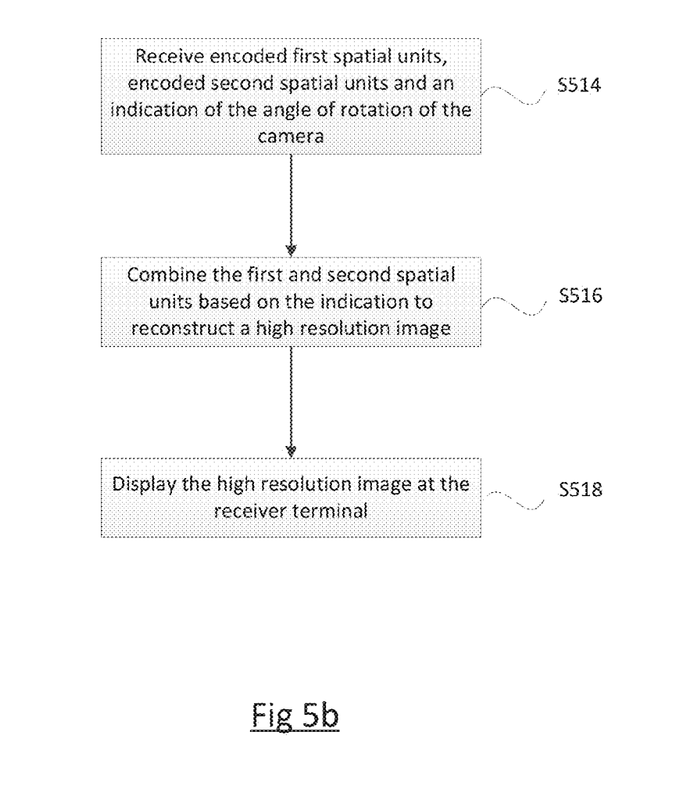
FIG. 5b is a flow chart for a process of receiving video data from a transmitter terminal at a receiver terminal.

With reference to FIGS. 5a and 5b there are now described methods of transmitting video data from the user terminal 102 to the user terminal 108 and of receiving the video data at the user terminal 108.

In step S502 image data of a first frame (e.g. frame 1) of a video signal is captured by the camera 208 at the user terminal 102. The video signal is made up of a sequence of a plurality of frames. The image data of the first frame which is captured by the camera 208 may comprise data values (e.g. luminance and chrominance values according to the YUV colour space scheme) for each of a plurality of image regions, or "captured pixels", of the first frame. The number of image regions (or "captured pixels") in the image data captured by the camera 208 for each frame may vary according to the specification of the camera 208. For example, the camera 208 may be a 10 megapixel camera such that it will capture image data for ten million separate image regions of each frame of the video signal. The image data of the first frame captured by the camera 208 is passed from the camera 208 to the encoder module 302.

In step S504, the encoder module 302 uses the image data of the first frame captured by the camera 208 in step S502 to determine one or more encoded first spatial units (or "encoded pixels") of the first frame. The number of encoded spatial units (or "encoded pixels") may or may not be the same as the number of image regions (or "captured pixels") captured by the camera 208 for the first frame. For example, in various embodiments, there are fewer encoded pixels than there are captured pixels for the first frame, such that the encoding process reduces the amount of data required to represent the first frame of the video signal. For example, the data values for the image regions in the first frame captured by the camera 208 may be grouped together into a plurality of groups wherein each of the encoded spatial units of the first frame are determined based on a combination of the data values in a respective group of the data values.

The encoded spatial units of the first frame determined by the encoder module 302 in step S504 are output to the transmitter module 304.

In step S506 image data of a second frame (frame 2) of the video signal is captured by the camera 208 at the user terminal 102. Similarly to with the first frame, the image data of the second frame which is captured by the camera 208 may comprise data values (e.g. luminance and chrominance values according to the YUV colour space scheme) for each of a plurality of image regions, or "captured pixels", of the second frame. The first and second frames (frames 1 and 2) could occur at any point in the video signal. For example, there may be other frames before and/or after the first and second frames in the video signal.

Furthermore, the first and second frames may, or may not, be consecutive frames in the video signal.

The image data of the second frame captured by the camera 208 is passed from the camera 208 to the encoder module 302. The camera 208 captures the image data of the second frame at some time subsequent to capturing the image data of the first frame. For example, if the time at which the image data of the first frame is captured is $t_1$, frames 1 and 2 are consecutive frames in the video signal and the frame rate of the video signal is given by FR (given in terms of frames per second such that the time interval between the first and second frames of the video signal is given by $\Delta t_{12}$, where $$\Delta t_{12} = \frac{1}{FR}\Bigr),$$

then the time at which the image data of the second frame is captured, $t_2$, is given by:

$$t_2 = t_1 + \Delta t_{12}.$$

It is worth noting at this point that the camera 208 may have moved during the time interval $\Delta t_{12}$, either intentionally or not intentionally. This is discussed in more detail later in the description.

In step S508, the encoder module 302 uses the image data of the second frame captured by the camera 208 in step S506 to determine one or more encoded second spatial units (or "encoded pixels") of the second frame. As described above in relation to the first frame, the number of encoded spatial units (or "encoded pixels") may or may not be the same as the number of image regions (or "captured pixels") captured by the camera 208 for the second frame. For example, in various embodiments, there are fewer encoded pixels than there are captured pixels for the second frame, thereby reducing the amount of data required to represent the second frame of the video signal. For example, the data values for the image regions in the second frame captured by the camera 208 may be grouped together into a plurality of groups wherein each of the encoded spatial units of the second frame are determined based on a combination of the data values in a respective group of the data values.

The encoded spatial units of the second frame determined by the encoder module 302 in step S508 are output to the transmitter module 304.

The encoder module 302 may encode the video data received from the camera 208 (e.g. the image data of the first and second frames) in accordance with known techniques, such as into an MPEG or H.263 format. For example, the encoder module 302 may comprise a Discrete Cosine Transform block for transforming the image data into the frequency domain, a quantizer block for quantizing the transformed image data and an encoder block for encoding the transformed and quantized image data. The image data may be encoded according to known techniques such as intra or inter encoding of the image data. Furthermore, the image data may take any suitable form such as complying with the YUV or RGB colour space schemes.

In step S510 the gyro sensor 210 detects an angle of rotation of the user terminal 102 between times $t_1$ and $t_2$, that is between the time at which the camera 208 captures the image data of the first frame in step S502 and the time at which the camera 208 captures the image data of the second frame in step S506. Since, in the various embodiments shown in the Figures, both the camera 208 and the gyro sensor 210 are integrated into the user terminal 102, the angle of rotation detected by the gyro sensor 210 is the angle of rotation of the camera 208. The use a gyro sensor is known in the art to determine an angle of rotation between two points in time. A gyro sensor is used in various embodiments described herein, but any suitable rotational motion sensor could be used to detect the angle of rotation of the camera 208 between the first and second frames in other embodiments. An indication of the detected angle of rotation of the camera 208 between the first and second frames is output to the transmitter module 304. The indication may comprise the detected angle itself or some other data which can be used to indicate the detected angle. For example, the indication may comprise a difference value which specifies the difference in the angle of rotation of camera 208 relative to a previous angle of rotation of the camera 208 between two previous frames of the video signal, or relative to a reference value which is known to both the transmitter terminal 102 and the receiver terminal 108 in the video transmission session. It can therefore be appreciated that the indication does not need to explicitly include the detected angle of rotation of the camera 208 between the first and second frames, but it should indicate the detected angle such that the receiver terminal 108 can determine the detected angle using the indication.

In step S512 the transmitter block 304 transmits the encoded spatial units of the first frame, the encoded spatial units of the second frame, and the indication of the angle of rotation of the camera 208 between the first and second frames over the network 106 to the receiver terminal 108. The encoded spatial units of the first frame, the encoded spatial units of the second frame, and the indication of the angle of rotation of the camera 208 between the first and second frames may be transmitted together or separately from the user terminal 102 to the user terminal 108. For example, the encoded spatial units of the first frame may be transmitted when they have been determined by the encoder module 302, which will likely be before the encoded spatial units of the second frame are transmitted. The indication of the angle of rotation of the camera 208 may be transmitted before, after or substantially simultaneously with transmission of the first spatial units. The indication of the angle of rotation of the camera 208 may be transmitted and before, after or substantially simultaneously with transmission of the second spatial units.

It should be noted that the order of the steps shown in FIG. 5a may be varied to that described above.

With reference to FIG. 5b the steps performed at the receiver terminal 108 are now described. In step S514 the encoded spatial units of the first frame, the encoded spatial units of the second frame, and the indication of the angle of rotation of the camera 208 between the first and second frames which were transmitted in step S512 are received at the receiver terminal 108, and are passed to the decoder module 402.

In step S516 the decoder module 402 combines the spatial units of the first and second frames based on the indication of the angle of rotation of the camera 208 between the first and second frames. For example, the decoder module 402 may comprise a decoder block for decoding the encoded spatial units of the first and second frames according to the decoding scheme (e.g. by intra or inter decoding using an MPEG or H.263 protocol) corresponding to the encoding scheme used by the encoder module 302 of the transmitter terminal 102. The decoder module 402 may also comprise a dequantizer block for dequantizing the decoded image data, and an Inverse Discrete Cosine Transform block for transforming the image data into the spatial domain. The decoder may also comprise a super resolution block in which the spatial units of the first and second frames are combined based on the indication of the angle of rotation of the camera 208 between the first and second frames, to reconstruct an image of a higher spatial resolution than the spatial resolution of the spatial units of the first frame and the resolution of the spatial units of the second frame. This is described in more detail below with reference to FIGS. 6a to 7b.

The high resolution image which is reconstructed by the decoder module 402 is passed to the display 404. In step S518 the high resolution image is output on the display 404 of the user terminal 108 to the user 110. This allows the user 110 to view the image at the high resolution. It is worth noting that the display 404 has its own resolution constraints. In particular the display will have a finite number of "display pixels" with which it can display images. For example, where the user terminal 108 is a mobile phone with a 1 megapixel display 404, the display 404 has a million pixels with which it can display images. The number of pixels in the display 404 will likely be different to (and probably greater than) the number of encoded spatial units in the first frame and the number of encoded spatial units in the second frame. Therefore the display may be capable of displaying images at a higher resolution than that of the encoded spatial units of the first and second frames and also at a higher resolution than that of the reconstructed image. The display 404 includes processing means for converting the reconstructed image for display on the display 404 in accordance with the number of pixels of the display 404.

Additionally, or alternatively, to displaying the high resolution image at the display 404, the high resolution image may be stored in storage means (e.g. memory) at the user terminal 108 or may be used in other ways by the user terminal 108, for example, the high resolution image may be transmitted from the user terminal 108 to another terminal, e.g. over the network 106.

Figure 6A:
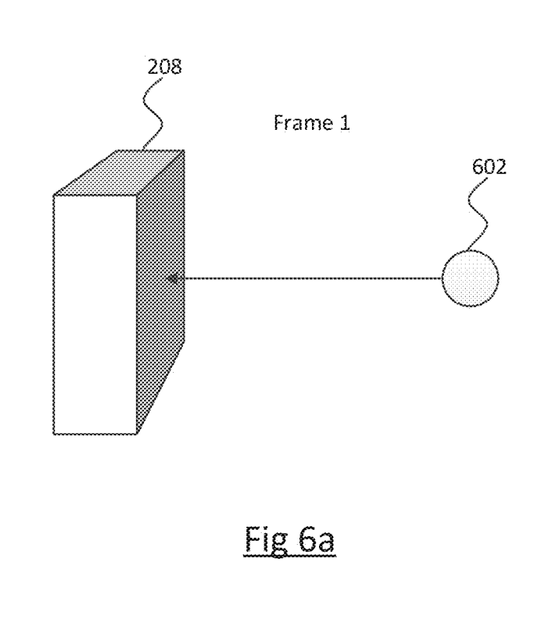
FIG. 6a is a diagram showing a camera capturing a first frame in a first situation.
Figure 6B:
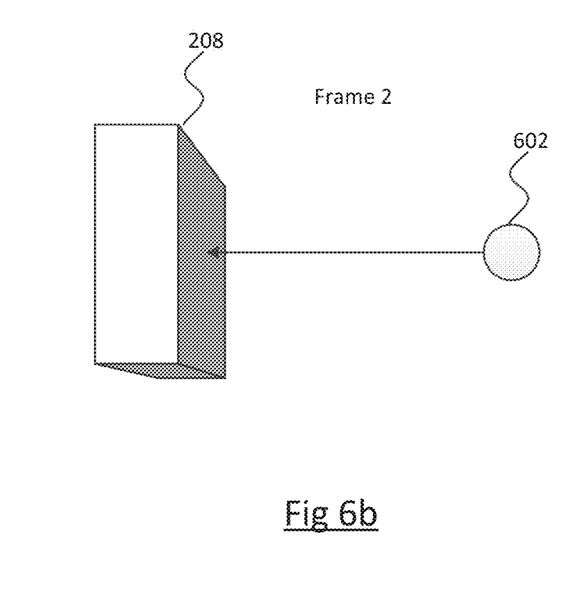
FIG. 6b is a diagram showing a camera capturing a second frame in the first situation.
Figure 6C:
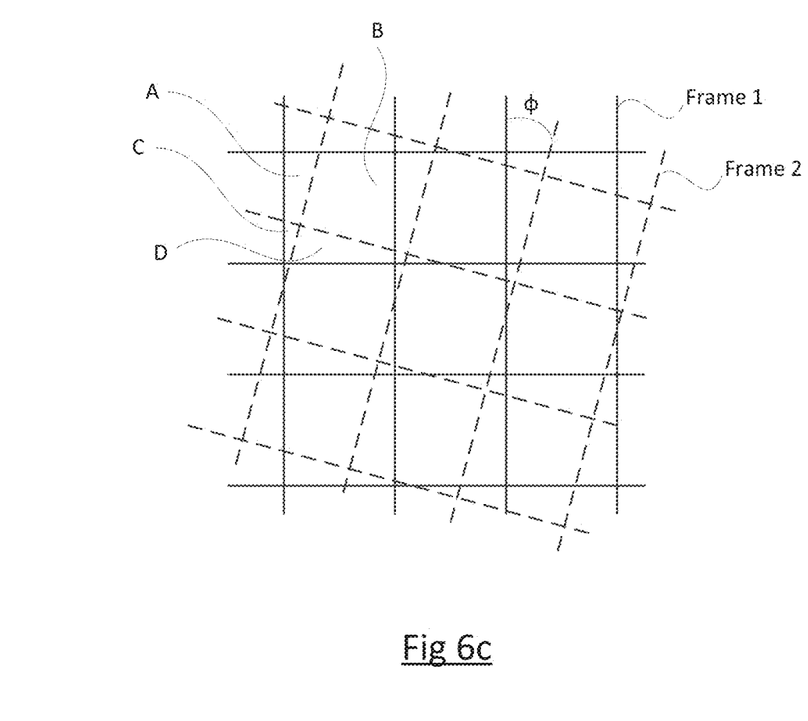
FIG. 6c is a representation of spatial units of first and second frames in the first situation.

FIGS. 6a to 6c show a way in which the rotation of the camera 208 between the first and second frames can be used to reconstruct the high resolution image at the receiver terminal 108. FIG. 6a shows the camera 208 capturing image data of the first frame of the video signal from an object 602. FIG. 6b shows the camera 208 capturing image data of the second frame of the video signal from the object 602. In the time interval $\Delta t_{12}$ between the first and second frames the camera 208 has rotated by an angle $\phi$ in the plane perpendicular to the direction at which the image data of the first frame is captured by the camera 208 from the object 602.

The receiver terminal 108 determines a plurality of image regions corresponding to a plurality of combinations of partially overlapping spatial units of the first and second frames based on the received indication of the angle of rotation of the camera 208 between the first and second frames. FIG. 6c shows a representation of nine of the spatial units of the first frame (shown with non-dashed lines) captured as shown in FIG. 6a and a representation of a corresponding nine of the spatial units of the second frame (shown with dashed lines) captured as shown in FIG. 6b. The spatial units of the first and second frames are shown overlaid as they would be for the combining of the spatial units of the first and second frames performed in step S516. It can be seen in FIG. 6c that the angular rotation of the camera 208 by the angle $\phi$ causes a rotational shift of the spatial units of the second frame relative to the spatial units of the first frame. In other words, the angular rotation of the camera 208 by the angle $\phi$ results in the spatial units of the second frame (shown with dashed lines) being unaligned with the spatial units of the first frame (shown with non-dashed lines) such that each of the spatial units of the second frame partially overlaps spatially with at least one of the spatial units of the first frame.

When the spatial units of the first and second frames are combined in step S516 image data values are determined for each distinct image region given by each distinct combination of partially overlapping first and second spatial units. For example, the top left of the nine spatial units of the first frame shown in FIG. 6c partially overlaps with four different spatial units of the second frame in the image regions labelled A to D in FIG. 6c. Therefore, each of these image regions (A to D) can be represented by a distinct combination of partially overlapping first and second spatial units. Therefore, by combining the spatial units of the first and second frames, because they are unaligned due to the rotation of the camera 208 between the first and second frames, an image of higher resolution than that of the first and second spatial units can be constructed which has distinct data values for distinct image regions given by distinct combinations of partially overlapping spatial units of the first and second frames.

Figure 7A:
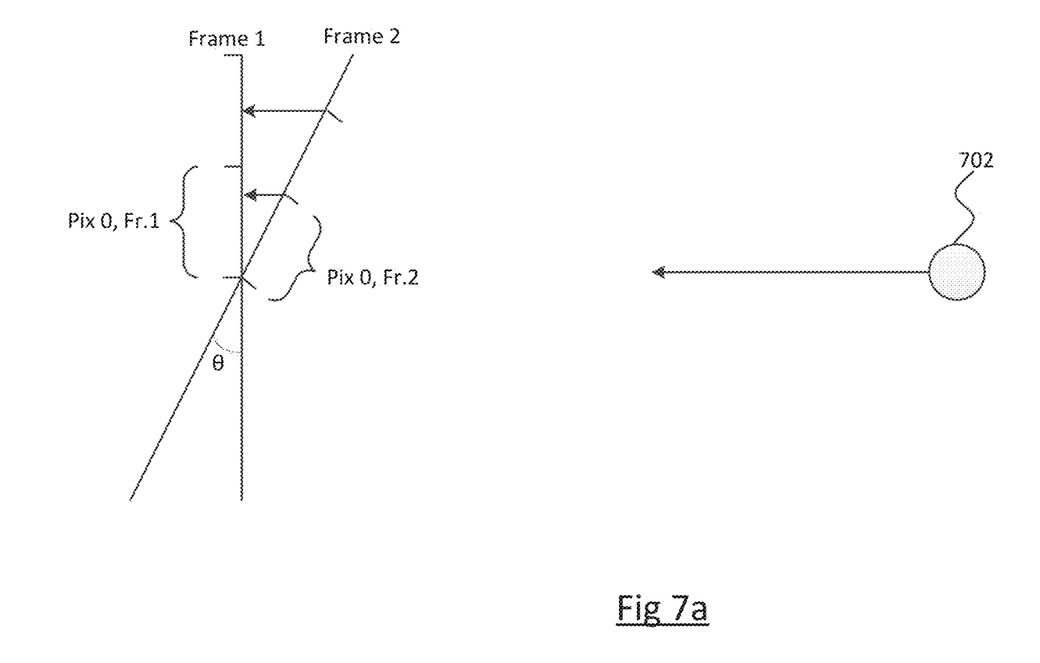
FIG. 7a is a diagram representing a first and a second frame captured by a camera in a second situation.
Figure 7B:
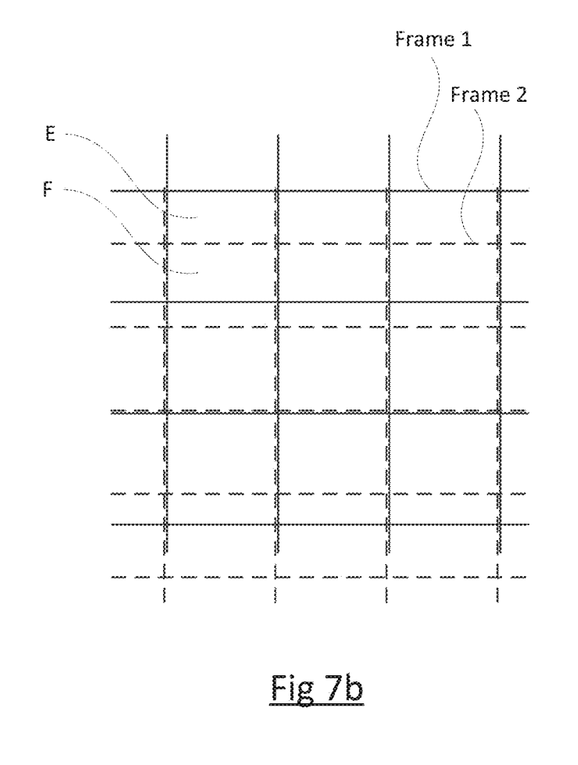
FIG. 7b is a representation of spatial units of first and second frames in the second situation.

FIGS. 7a and 7b show another way in which the rotation of the camera 208 between the first and second frames can be used to reconstruct the high resolution image at the receiver terminal 108. FIG. 7a shows the first and second frames (including an image of an object 702) which are captured by the camera 208. In the time interval $\Delta t_{12}$ between the first and second frames the camera 208 has rotated by an angle $\theta$ outside of the plane perpendicular to the direction at which the image data of the first frame is captured by the camera 208 from the object 702.

FIG. 7b shows a representation of nine of the spatial units of the first frame (shown with non-dashed lines) and a representation of a corresponding nine of the spatial units of the second frame (shown with dashed lines) captured as shown in FIG. 7a. The spatial units of the first and second frames are shown overlaid as they would be for the combining of the spatial units of the first and second frames performed in step S516. In order for the spatial units of the first and second frames to be combined, step S516 comprises determining a projection, into a common plane, of the spatial units of either or both the first and second frames based on the angle of rotation of the camera 208. The spatial units of the first and second frames can then be combined in the common plane. The common plane may for example be the plane of the first frame or the plane of the second frame, or some other plane.

As indicated in the embodiment shown in FIG. 7a the spatial units of the second frame are projected into the plane of the first frame. This projection of the spatial units of the second frame causes a resizing (e.g. by a factor of $\cos \theta$) of the spatial units of the second frame relative to the spatial units of the first frame in the common plane of the first frame. Therefore, as shown in FIG. 7b, the spatial units of the second frame are smaller (e.g. in the vertical dimension as shown in FIG. 7b due to the rotation shown in FIG. 7a). This resizing of the spatial units of the second frame (due to the projection into the plane of the first frame) causes the spatial units of the second frame to be unaligned (in the vertical direction at least, as shown in FIG. 7b) with the spatial units of the first frame, such that each of the spatial units of the second frame partially overlaps spatially with at least one of the spatial units of the first frame.

When the spatial units of the first and second frames are combined in step S516 image data values are determined for each distinct image region given by each distinct combination of partially overlapping first and second spatial units. For example, the top left of the nine spatial units of the first frame shown in FIG. 7b partially overlaps with two different spatial units of the second frame in the image regions labelled E and F in FIG. 7b. Therefore, each of these image regions (E and F) can be represented by a distinct combination of partially overlapping first and second spatial units. Therefore, by combining the spatial units of the first and second frames, because they are unaligned due to the rotation of the camera 208 between the first and second frames, an image of higher resolution than that of the first and second spatial units can be constructed which has distinct data values for distinct image regions (e.g. image regions E and F) given by distinct combinations of partially overlapping spatial units of the first and second frames. The step of combining the partially overlapping spatial units of the first and second frames may comprise determining an average of the partially overlapping spatial units (e.g. the YUV values of the spatial units) for the respective image region.

In addition to, or as an alternative to, rotation in the vertical direction as shown in FIGS. 7a and 7b, rotation of the camera 208 may occur in a horizontal direction outside of the plane perpendicular to the direction at which the image data of the first frame is captured by the camera 208 from the object 702. Therefore, the spatial units of the second frame may be resized in the horizontal direction projected into the common plane of the first frame for combining with the spatial units of the first frame in step S516 in addition to, or as an alternative to, the resizing of the spatial units of the second in the vertical direction as shown in FIG. 7b.

The rotation of the camera 208 could have both: (i) rotational components in the plane perpendicular to the direction at which the image data of the first frame is captured by the camera 208 (as shown and described in relation to FIGS. 6a to 6c), and (ii) rotational components outside of the plane perpendicular to the direction at which the image data of the first frame is captured by the camera 208 (as shown and described in relation to FIGS. 7a and 7b). Therefore the two processes described above in relation to these two types of rotational components may be implemented together.

In the methods described herein the rotation of the camera 208, which may be unintentional particularly when the user terminal 102 is a mobile terminal being held by the user 104 when the camera 208 is capturing the image data of the first and second frames of the video signal, can be used to increase the resolution of the image that is re-constructed at the receiver terminal 108 in the video transmission session. One spatial unit of the first frame can overlap partially with multiple, e.g. four or two, spatial units of the second frame thus giving additional information to enable reconstructing of an image with increased resolution.

A "super-resolution" scheme as described above may be used to deliberately down-grade the resolution being transmitted in a video stream in order to reduce the bit-rate, and then reconstruct the higher-resolution image again at the receiver. Of course it is not possible to get "free data"—but the idea is to trade bitrate for reconstruction time, since the scheme will require multiple frames in order to reconstruct the higher resolution image at the receiver, thus taking a longer time to obtain the higher resolution than if the data was simply transmitted at the higher resolution in each frame.

For this reason, the methods described herein may be less useful for encoding very fast motion compared to encoding motion which is slower but more detailed. In a one embodiment, because the image of a frame is split up into blocks and encoded on a block-by-block basis, it is possible to encode different regions of the same video differently. For example, based on motion estimation analysis of the video image, a slow moving background may be encoded using lower-resolution units, whilst a faster moving foreground in the same image may be encoded using a higher-resolution; or even vice versa. In this case the indication of the angle of rotation of the camera 208 may be signalled on a block-by-block basis, where each block comprises multiple lower-resolution units (or on a macroblock-by-macroblock basis, etc.). For example, further image data of the video signal may be encoded using a different encoding scheme than that used to encode the first and second spatial units, and the encoded further image data may be transmitted to the receiver terminal 108.

The methods described herein are particularly useful when the user terminal 102 is a handheld device in which the position of the camera 208 moves constantly due to inability of the human hand to hold the camera 208 in a fixed position. As described above, these random oscillations around the intended direction of capturing the video stream can be used to extract super resolution video data. The resolution increase will depend on the capture resolution and the content of the video stream.

The methods described above relate to encoding and combining spatial units of the first and the second frame. The method may be extended to include corresponding encoding and combining of spatial units of further frames of the video signal. In this way more spatial units from more than two frames of the video signal may be combined in step S516 which may further increase the resolution of the reconstructed image. In order to implement this, the gyro sensor 210 detects the angle of rotation of the camera 208 between frames (e.g. consecutive frames) of the video signal in the same way as described above in relation to the first and second frames. For example, the method may comprise using image data of at least one further frame of the video signal captured by the camera 208 to determine one or more encoded further spatial units of each of the at least one further frame at lower spatial resolution. The one or more encoded further spatial units of the at least one further frame are transmitted to the receiver terminal 108. The further spatial units are at least partially unaligned with the spatial units of the first or second frames as a result of at least one further angle of rotation of the camera 208, such that each of the further spatial units partially overlaps spatially with at least one spatial unit of the first frame. At least one indication of the at least one further angle of rotation of the camera 208 detected by the gyro sensor 210 for the at least one further frame is transmitted to the receiver terminal 108. At the receiver terminal 108 the method may comprise receiving the one or more encoded spatial units of the at least one further frame of the video signal and receiving the at least one indication of at least one further angle of rotation of the camera for the at least one further frame. The decoder module 402 of the receiver terminal 108 can then combine the first, second and further spatial units based on the indications of the angles of rotation of the camera 208 so as to reconstruct an image of at least a higher spatial resolution than the spatial resolution of the first spatial units, the second spatial units and the further spatial units.

In the embodiments described above, the camera 208 is integrated into the user terminal 102. However, the camera 208 could be implemented in a manner in which it is not integrated into the user terminal 102, and may for example, be connected to the user terminal 102 by a link such as a USB link or a wireless connection (e.g. a Wi-Fi, Bluetooth or infra-red connection). When the camera 208 is not integrated in the user terminal 102, the gyro sensor 210 is implemented in a manner that it detects the rotational motion of the camera 208, which is not necessarily the same as the rotational motion of the user terminal 102. One way to do this would be to integrate the gyro sensor 210 in the camera 208, such that any rotational motion of the camera 208 is detected by the gyro sensor 210.

Furthermore, in the embodiments described above, the encoder module 302 is shown and described as being separate to the camera 208. However, in some embodiments the encoder module 302 could be implemented in the camera 208.

In the embodiments described above the user terminal 102 is described as the transmitter terminal of the video transmission session and the user terminal 108 is described as the receiver terminal of the video transmission session. However, both user terminals 102 and 108 may be capable of acting as both a transmitter terminal and a receiver terminal in the video transmission session, such that the video transmission session may be a bi-directional video transmission session. Therefore the user terminal 102 may also comprise a decoder module and a display corresponding to the decoder module 402 and the display 404 of the user terminal 108 described above. Similarly, the user terminal 108 may also comprise a camera, an encoder module, a gyro sensor and a transmitter module corresponding to the camera 208, the encoder module 302, the gyro sensor 210 and the transmitter module 304 of the user terminal 102 described above.

The method operations shown in FIGS. 5a and 5b may be implemented in software executed on the CPUs of the user terminals 102 and 108 respectively or implemented in hardware in the user terminals 102 and 108. When the method operations are implemented in software, they may be provided by way of a computer program product (e.g. as part of the communication client executed on the user terminals 102 and 108) embodied on a tangible computer-readable storage medium which is configured so as when executed on the CPUs of the user terminals 102 and 108 to perform the function of the operations as described above.

There has been described herein a method of transmitting video data from a transmitter terminal to a receiver terminal, wherein the method may be implemented by a computer program product being embodied on a tangible computer-readable storage medium and configured so as when executed on a processor of the transmitter terminal to perform the operations of the method of: using image data of a first frame of a video signal captured by a camera to determine one or more encoded first spatial units of the first frame at lower spatial resolution; transmitting the one or more encoded first spatial units of the first frame to the receiver terminal; using image data of a second frame of the video signal captured by the camera to determine one or more encoded second spatial units of the second frame at lower spatial resolution; transmitting, to the receiver terminal, an indication of an angle of rotation of the camera between the first and second frames detected using a rotational motion sensor; and transmitting the one or more encoded second spatial units of the second frame to the receiver terminal, wherein the second spatial units are at least partially unaligned with the first spatial units as a result of the angle of rotation of the camera between the first and second frames, and wherein each of the second spatial units partially overlaps spatially with at least one first spatial unit, thereby enabling the receiver terminal to combine the first and second spatial units based on said indication so as to reconstruct an image of at least a higher spatial resolution than the lower spatial resolution of the first spatial units and the lower spatial resolution of the second spatial units.

There has also been described a mobile terminal configured to transmit video data to a receiver terminal, the mobile terminal comprising: a camera configured to: (i) capture image data of a first frame of a video signal, and (ii) capture image data of a second frame of the video signal; a rotational motion sensor configured to detect an angle of rotation of the camera between the first and second frames; an encoder configured to: (i) use the captured image data of the first frame to determine one or more encoded first spatial units of the first frame at lower spatial resolution, and (ii) use the captured image data of the second frame to determine one or more encoded second spatial units of the second frame at lower spatial resolution, such that the second spatial units are at least partially unaligned with the first spatial units as a result of the angle of rotation of the camera between the first and second frames, and wherein each of the second spatial units partially overlaps spatially with at least one first spatial unit; and a transmitter configured to transmit to the receiver terminal: (i) the one or more encoded first spatial units of the first frame, (ii) the one or more encoded second spatial units of the second frame, and (iii) an indication of the detected angle of rotation, such that the mobile terminal is configured to enable the receiver terminal to combine the first and second spatial units based on said indication so as to reconstruct an image of at least a higher spatial resolution than the lower spatial resolution of the first spatial units and the lower spatial resolution of the second spatial units.

There has also been described a method of receiving video data from a transmitter terminal at a receiver terminal, wherein the method may be implemented by a computer program product being embodied on a tangible computer-readable storage medium and configured so as when executed on a processor of the receiver terminal to perform the operations of the method of: receiving one or more encoded first spatial units of a first frame of a video signal at lower spatial resolution, the one or more encoded first spatial units being captured by a camera and transmitted from the transmitter terminal; receiving one or more encoded second spatial units of a second frame of the video signal at lower spatial resolution, the one or more encoded second spatial units being captured by the camera and transmitted from the transmitter terminal; receiving an indication of an angle of rotation of the camera between the first and second frames detected using a rotational motion sensor, wherein the second spatial units are at least partially unaligned with the first spatial units as a result of the angle of rotation of the camera between the first and second frames, and wherein each of the second spatial units partially overlaps spatially with at least one first spatial unit; combining the first and second spatial units based on said indication so as to reconstruct an image of at least a higher spatial resolution than the lower spatial resolution of the first spatial units and the lower spatial resolution of the second spatial units.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A system for transmitting video data from a transmitter terminal of a communication system, over a network, to a receiver terminal of the communication system, the system comprising:
   a processor; and
   a memory comprising instructions of a communication client for the communication system executable by the processor to perform operations comprising:

encoding, on a block-by-block basis, one or more first spatial units at a spatial resolution from image data of a first frame of a video signal captured by a camera;

transmitting the one or more encoded first spatial units of the first frame to the receiver terminal;

encoding, on a block-by-block basis, one or more second spatial units at the spatial resolution from image data of a second frame of the video signal captured by the camera;

transmitting on a block-by-block basis, over the network of the communication system to the receiver terminal, an indication of an angle of rotation of the camera between the first and second frames detected using a rotational motion sensor; and transmitting the one or more encoded second spatial units of the second frame to the receiver terminal, wherein the second spatial units are at least partially unaligned with the first spatial units as a result of the angle of rotation of the camera between the first and second frames, and wherein each of the second spatial units partially overlaps spatially with at least one first spatial unit, effective to enable the receiver terminal to combine the first and second spatial units based on receiving the transmitted indication from the transmitter terminal, so as to reconstruct an image of at least a higher spatial resolution than the spatial resolution of the first spatial units and the spatial resolution of the second spatial units.

2. The system of claim 1 wherein the rotation of the camera includes rotation in the plane perpendicular to the direction at which the image data of the first frame is captured by the camera, said rotation in said plane causing a rotational shift of the second spatial units relative to the first spatial units for combining the first and second spatial units at the receiver terminal.

3. The system of claim 1 wherein the rotation of the camera includes rotation outside of the plane perpendicular to the direction at which the image data of the first frame is captured by the camera, said rotation outside of said plane causing a resizing of the second spatial units relative to the first spatial units for combining the first and second spatial units at the receiver terminal.

4. The system of claim 1 wherein the image data of the first frame comprises a plurality of data values, and wherein each of the first spatial units is determined based on a combination of a respective group of said data values.

5. The system of claim 1 wherein the image data of the second frame comprises a plurality of data values, and wherein each of the second spatial units is determined based on a combination of a respective group of said data values.

6. The system of claim 1 the instructions further executable to perform operations comprising:

using image data of at least one further frame of the video signal captured by the camera to determine one or more encoded further spatial units of each of the at least one further frame at the spatial resolution;

transmitting, to the receiver terminal, at least one indication of at least one further angle of rotation of the camera detected by the rotational motion sensor for the at least one further frame; and transmitting the one or more encoded further spatial units of the at least one further frame to the receiver terminal, wherein the further spatial units are at least partially unaligned with the first or second spatial units as a result of the at least one further angle of rotation of the camera, and wherein each of the further spatial units partially overlaps spatially with at least one first spatial unit, thereby enabling the receiver terminal to combine the first, second and further spatial units based on said indications so as to reconstruct an image of at least a higher spatial resolution than the spatial resolution of the first spatial units, the spatial resolution of the second spatial units and the spatial resolution of the further spatial units.

7. The system of claim 1 the instructions further executable to perform operations comprising:

encoding further image data of the video signal using a different encoding scheme than that used to encode the first and second spatial units; and transmitting the encoded further image data to the receiver terminal.

8. The system of claim 1 wherein the camera and the rotational motion sensor are implemented in the transmitter terminal.

9. The system of claim 1 wherein the transmitter terminal is implemented as a mobile terminal.

10. A mobile terminal of a communication system configured to transmit video data to a receiver terminal of the communication system over a network, the mobile terminal comprising:

a camera configured to:
  capture image data of a first frame of a video signal; and
  capture image data of a second frame of the video signal;

a rotational motion sensor configured to detect an angle of rotation of the camera between the first and second frames;

an encoder configured to:
  encode, on a block-by-block basis, the captured image data of the first frame, the encoding comprising determining one or more encoded first spatial units of the first frame at a spatial resolution; and
  encode, on a block-by-block basis, the captured image data of the second frame, the encoding the captured image data of the second frame comprising determining one or more encoded second spatial units of the second frame at the spatial resolution, such that the second spatial units are at least partially unaligned with the first spatial units as a result of the angle of rotation of the camera between the first and second frames, and wherein each of the second spatial units partially overlaps spatially with at least one first spatial unit; and a transmitter configured to transmit to the receiver terminal over the network: the one or more encoded first spatial units of the first frame, the one or more encoded second spatial units of the second frame, and an indication of the detected angle of rotation, the indication being transmitted on a block-by-block basis, such that the mobile terminal is configured to enable the receiver terminal to combine the first and second spatial units based on receiving the transmitted indication from the mobile terminal, so as to reconstruct an image of at least a higher spatial resolution than the spatial resolution of the first spatial units and the spatial resolution of the second spatial units.

11. A system for receiving video data from a transmitter terminal of a communication system over a network at a receiver terminal of the communication system, the system comprising:

a processor; and a memory comprising instructions executable by the processor to perform operations comprising:

receiving one or more encoded first spatial units of a first frame of a video signal at a spatial resolution, the one or more encoded first spatial units being captured by a camera, encoded on a block-by-block basis, and transmitted from the transmitter terminal;

receiving one or more encoded second spatial units of a second frame of the video signal at the spatial resolution, the one or more encoded second spatial units being captured by the camera, encoded on a block-by-block basis, and transmitted from the transmitter terminal;

receiving, over the network from the transmitter terminal, an indication of an angle of rotation of the camera between the first and second frames detected using a rotational motion sensor, wherein the second spatial units are at least partially unaligned with the first spatial units as a result of the angle of rotation of the camera between the first and second frames, and wherein each of the second spatial units partially overlaps spatially with at least one first spatial unit, and wherein the indication is received on a block-by-block basis;

combining the first and second spatial units based on receiving the transmitted indication from the transmitter terminal, so as to reconstruct an image of at least a higher spatial resolution than the spatial resolution of the first spatial units and the spatial resolution of the second spatial units.

12. The system of claim 11 wherein said combining the first and second spatial units comprises determining a projection, into a common plane, of the first or second spatial units based on the angle of rotation of the camera, wherein the first and second spatial units are combined in the common plane.

13. The system of claim 12 wherein the common plane is the plane of the first frame or the plane of the second frame.

14. The system of claim 11 wherein said combining the first and second spatial units comprises determining a respective image value of the reconstructed image for each of a plurality of image regions corresponding to a plurality of combinations of partially overlapping first and second spatial units.

15. The system of claim 14 wherein said determining a respective image value of the reconstructed image for each of a plurality of image regions corresponding to a plurality of combinations of partially overlapping first and second spatial units comprises determining an average of the first and second spatial units for each of the plurality of combinations of partially overlapping first and second spatial units.

16. The system of claim 14 the instructions further executable to perform operations comprising:
determining the plurality of image regions corresponding to the plurality of combinations of partially overlapping first and second spatial units based on the received indication of the angle of rotation of the camera between the first and second frames.

17. The system of claim 11 wherein the rotation of the camera includes rotation in the plane perpendicular to the direction at which the image data of the first frame is captured by the camera, said rotation in said plane causing a rotational shift of the second spatial units relative to the first spatial units for said combining the first and second spatial units.

18. The system of claim 11 wherein the rotation of the camera includes rotation outside of the plane perpendicular to the direction at which the image data of the first frame is captured by the camera, said rotation outside of said plane causing a resizing of the second spatial units relative to the first spatial units for said combining the first and second spatial units.

19. The system of claim 11 the instructions further executable to perform operations comprising:
receiving one or more encoded further spatial units of at least one further frame of the video signal at the spatial resolution, the one or more encoded further spatial units being captured by the camera and transmitted from the transmitter terminal;
receiving at least one indication of at least one further angle of rotation of the camera for the at least one further frame detected using the rotational motion sensor, wherein the further spatial units are at least partially unaligned with the first or second spatial units as a result of the at least one further angle of rotation of the camera, and wherein each of the further spatial units partially overlaps spatially with at least one first spatial unit; and
combining the first, second and further spatial units based on said indications so as to reconstruct an image of at least a higher spatial resolution than the spatial resolution of the first spatial units, the spatial resolution of the second spatial units and the spatial resolution of the further spatial units.

20. The system of claim 11 the instructions further executable to perform operations comprising:
outputting the reconstructed image at a display of the receiver terminal.

* * * * *